(12) United States Patent
Tabery et al.

(10) Patent No.: US 7,944,858 B2
(45) Date of Patent: May 17, 2011

(54) METHOD FOR PROTECTING A NETWORK CONFIGURATION SET UP BY A SPANNING TREE PROTOCOL

(75) Inventors: Peter Tabery, Munich (DE); Ralf Klotsche, Neuenbuerg (DE)

(73) Assignee: Alcatel-Lucent, Paris (FR)

( * ) Notice: Subject to any disclaimer, the term of this patent is extended or adjusted under 35 U.S.C. 154(b) by 208 days.

(21) Appl. No.: 12/319,496

(22) Filed: Jan. 5, 2009

(65) Prior Publication Data
US 2009/0175203 A1 Jul. 9, 2009

(30) Foreign Application Priority Data

Jan. 8, 2008 (EP) ..................................... 08290016

(51) Int. Cl.
*H04L 12/28* (2006.01)
(52) U.S. Cl. ..................... 370/256; 370/230.1; 370/408; 726/26
(58) Field of Classification Search .................. 370/256, 370/230.1, 254, 408; 709/242; 726/13, 15, 726/3, 26; 713/153
See application file for complete search history.

(56) References Cited

U.S. PATENT DOCUMENTS

| | | | | |
|---|---|---|---|---|
| 6,578,086 | B1 * | 6/2003 | Regan et al. | 709/242 |
| 7,383,574 | B2 * | 6/2008 | Burrows et al. | 726/13 |
| 2006/0015643 | A1 * | 1/2006 | Orava et al. | 709/238 |
| 2006/0092862 | A1 * | 5/2006 | Benedetto et al. | 370/256 |
| 2006/0280131 | A1 * | 12/2006 | Rahman et al. | 370/256 |
| 2006/0282892 | A1 | 12/2006 | Jonnala et al. | |

OTHER PUBLICATIONS

Interworking Task Group of IEEE 802.1: Draft Standard for Local and Metropolitan Area Networks: Media Access Control (MAC) Bridges; IEEE P802.1D/D4, Oct. 31, 2003, New York.

* cited by examiner

*Primary Examiner* — Ayaz R Sheikh
*Assistant Examiner* — Mounir Moutaouakil
(74) *Attorney, Agent, or Firm* — Carmen Patti Law Group, LLC

(57) ABSTRACT

A method for protecting a network configuration set up by a spanning tree protocol, STP, by selecting one of a plurality of bridges (2 to 11) of a computer network (1) as a root bridge (2) and by selecting one of a plurality of bridge ports (2*a* to 11*a*, 3*b*, 4*b*, 6*b*, 7*b*, 9*b*, 10*b*) of each of the plurality of bridges (2 to 11) as a root port (2*a* to 11*a*), the method comprising the steps of: setting a sub-state of at least one bridge port (2*a* to 11*a*, 3*b*, 4*b*, 6*b*, 7*b*, 9*b*, 10*b*) of at least one of the bridges (2 to 11) to an active sub-state in case that bidirectional traffic passes through the bridge port (2*a* to 11*a*, 3*b*, 4*b*, 6*b*, 7*b*, 9*b*, 10*b*), receiving an STP message, in particular a Bridge Protocol Data Unit, BPDU, in one of the bridge ports (2*a* to 11*a*, 3*b*, 4*b*, 6*b*, 7*b*, 9*b*, 10*b*) being in the active sub-state, and protecting the network configuration by discarding the STP message and/or by sending an alarm message to a network management unit (27) in case that the STP message indicates a change of the root bridge (2) of the network configuration.

8 Claims, 3 Drawing Sheets

METHOD FOR PROTECTING A NETWORK CONFIGURATION SET UP BY A SPANNING TREE PROTOCOL

BACKGROUND OF THE INVENTION

In computer networks set up by a spanning tree protocol (STP), it is important to protect the network configuration which has been set up during a bootstrapping phase from malicious attackers. In case that such a malicious attacker interrupts a link between two neighboring bridges, e.g. by unplugging/cutting the cable or jamming the radio link, some or even all of the terminals (in case there is a redundant path) may be able to continue communicating. However, when an attacker injects forged STP messages, typically bridge protocol data units (BPDUs), the communication throughout the entire bridged network may be blocked by causing a reconfiguration of the spanning tree.

Thus, an attacker with access to a single link may not only interfere with the datagram transmission on that particular link, e.g., jamming the link, but may also impact the performance of the entire network. Similar effects may be produced when an attacker transmits forged BPDUs with the same root ID as the actual root, but with significantly lower root path costs, thus causing a major reconfiguration of the spanning tree as well.

In US 2006/0092862 A1, a process known as "STP root guard" is described which allows keeping the location of the root bridge in a core network by preventing bridge ports of bridges which are connected to external networks from being selected as root ports. However, such a process cannot prevent attacks on links of the core network itself.

In theory, it would also be possible to cryptographically sign all BPDUs such that the receiving bridge could verify the authenticity of the BPDU by checking the cryptographic signature. However, cryptographic protection of BPDUs would require significant configuration/management overhead as well as considerable computational resources in each bridge.

SUMMARY OF THE INVENTION

It is the object of the invention to provide: a method, a bridge, and a computer network which allow for protecting a network configuration set up by a spanning tree protocol from attacks using forged STP messages.

This object is achieved by a method as described above, comprising the steps of: setting a sub-state of at least one bridge port of at least one of the bridges to an active sub-state in case that bidirectional traffic passes through the bridge port, receiving an STP message, in particular a Bridge Protocol Data Unit, BPDU, in one of the bridge ports being in the active sub-state, and protecting the network configuration by discarding the STP message and/or by sending an alarm message to a network management unit in case that the STP message indicates a change of the root bridge of the network configuration.

If the bridge port is in the active sub-state, it sees bidirectional payload traffic, and it may be assumed that the root bridge is doing well and a BPDU announcing a different root bridge is probably forged, as changing the root bridge would not enhance the network's operation under these circumstances. Hence, disregarding such a BPDU will avoid unnecessary root bridge changes. Moreover, a network management unit may be informed about the occurrence of forged BPDUs and may take the necessary measures in order to identify and stop the attacker.

In a preferred variant, the change of the root bridge is indicated by a bridge port ID of the BPDU which is smaller than the bridge port ID of the root bridge of the network configuration. In case that the attacker transmits a BPDU carrying a root ID that is smaller than the ID of the current root bridge (corresponding to a higher priority of the bridge), in the state of the art, the bridge election mechanism would be restarted and a new spanning tree would be built starting from the attacker's location, as described in detail with reference to FIG. 2c. In the present scheme, when the root port which receives the BPDU is in the active sub-state, the BPDU of the attacker will be ignored, thus protecting the network configuration.

In a further preferred variant, the method further comprises the step of: checking the root path costs of the STP message for plausibility in case that the STP message indicates a change of the root port and a decrease of the root path costs, typically at a bridge port which is not the root port. A change of the network configuration may not only be caused by BPDUs which indicate a change of the root bridge, but also by BPDUs with forged root path costs, thus leading to a change of the root port of one or more of the bridges which also trigger a spanning tree reconfiguration. Although it is difficult to distinguish any forged BPDU from a legitimate BPDU announcing a topology change, customized plausibility checks may help defending such attacks.

In a preferred improvement of this variant, checking the root path costs for plausibility is performed by comparing the root path costs of the STP message with the actual root path costs, taking into account the topology of the network and/or a permitted range of root path costs set by the network management unit. In such a way, a BPDU with forged root path costs may be distinguished from BPDUs indicating regular topology changes.

A second aspect of the invention relates to a bridge for operating in a network configuration of a computer network as described above, the bridge comprising: a sub-state setting unit for setting the sub-state of at least one of the bridge ports to an active sub-state in case that bidirectional traffic passes through the bridge port, a receiving unit for receiving a STP message, in particular a Bridge Protocol Data Unit, BPDU, in one of the bridge ports being in the active sub-state, and a network configuration protection unit for protecting the network configuration by discarding the STP message and/or by sending an alarm message to a network management unit in case that the STP message indicates a change of the root bridge of the network configuration.

The sub-state setting unit is an additional state machine added to each of the forwarding bridge ports, i.e. to those bridge ports which are enabled by the STP. Thus, the sub-state setting unit can be used for splitting the forwarding state of the bridge port to an active and a passive sub-state. As long as bidirectional payload traffic from the terminals is conveyed through the forwarding bridge port, it is in the active sub-state. In case of, e.g., a link failure, the traffic ceases and the bridge port changes to the passive sub-state. Thus, a BPDU cannot cause a change of the sub-state, but may only lead to a change of the port state according to the STP, e.g. by disabling a forwarding bridge port during a re-configuration of the spanning tree. Such unwanted changes of the spanning tree may be avoided by identifying forged BPDUs, for example by assuming that a BPDU is forged when it indicates a change of the root bridge and the forwarding bridge port is in the active sub-state.

In a preferred embodiment, a change of the root bridge is indicated in the network configuration protection unit by a bridge port ID of the BPDU which is smaller than the bridge port ID of the root bridge. In case that a bridge port in the active sub-state receives such a BPDU, the network configuration protection unit discards the BPDU and/or transmits a warning message to the network management unit which may also serve as the STP instance of the network.

In a further preferred embodiment, the network configuration protection unit is adapted to check the root path costs of the STP message for plausibility in case that the STP message indicates a change of the root port and a decrease of the root path costs. Typically, such a check is performed when the BPDU is received in a bridge port which is not the root port.

In a preferred improvement of this embodiment, the network configuration protection unit is adapted to check the root path costs for plausibility by comparing the root path costs of the STP message with the actual root path costs, taking into account the topology of the network and/or a permitted range of root path costs set by the network management unit. In this case, additional information about the network topology is available in the network configuration protection unit which may be provided by the network management unit.

A third aspect of the invention is implemented in a computer network comprising a plurality of bridges of the type described above, the computer network operating in a network configuration set up by a spanning tree protocol, STP, by selecting one of the plurality of bridges as a root bridge and by selecting one of a plurality of bridge ports of each of the plurality of bridges as a root port. The STP generates a spanning tree during a bootstrapping phase of the network. In the operational phase, the network configuration is protected from attacks in the way described above and is consequently only modified in case of regular topology changes such as link failures etc.

In a preferred embodiment, the computer network further comprises a network management unit which may be co-located with other central server or gateway functionality of the network. The network management unit may also provide information about the topology of the network, in particular about a permitted range of root path costs.

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE DRAWINGS

Exemplary embodiments are shown in the diagrammatic drawing and are explained in the description below. The following are shown:

FIG. 3a shows a bridge for protecting the network configuration of FIG. 2a, FIG. 3b shows a state diagram of a bridge port of the bridge of FIG. 3a, and FIG. 4 shows a flow chart of a method for protecting the network configuration of FIG. 2a.

DETAILED DESCRIPTION OF PREFERRED EMBODIMENTS

The invention is based on the priority application EP08290016.8 which is hereby incorporated by reference.

The invention relates to a method for protecting a network configuration set up by a spanning tree protocol, STP, by selecting one of a plurality of bridges of a computer network as a root bridge and by selecting one of a plurality of bridge ports of each of the plurality of bridges as a root port, to a bridge for operating in a network configuration of the above-mentioned kind, and to a computer network comprising a plurality of bridges as described above.

Figure 1:
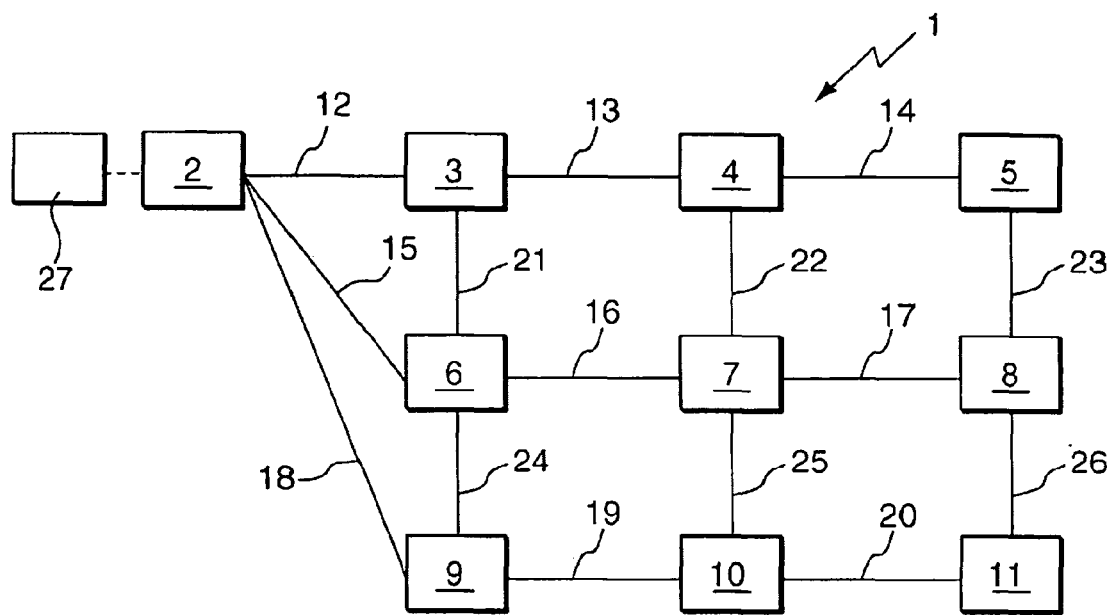
FIG. 1 shows a schematic diagram of a computer network comprising a plurality of interconnected bridges.

In FIG. 1, a computer network 1 is shown which has a plurality of bridges 2 to 11 being interconnected by a plurality of links 12 to 26. For transforming the network configuration of FIG. 1 to a tree-like network configuration (spanning tree) shown in FIG. 2a, a spanning tree protocol, STP, is executed during a bootstrapping phase of the computer network 1. The spanning tree protocol generates the spanning tree by deactivating the links 21 to 26 (dashed lines in FIG. 2a), thus obtaining a loop-free configuration which connects one of the bridges 2 at the head of the spanning tree, also referred to as the root bridge of the computer network 1, to each of the further bridges 3 to 11. When such a network configuration is attained, the terminals of the network (not shown) are interconnected by a loop-free network 1 and are thus able to transmit and receive datagrams. Thus, in the operational phase which follows the bootstrapping phase, the terminals' bidirectional data streams are conveyed to/from the gateway and, optionally, among terminals.

Figure 2A:
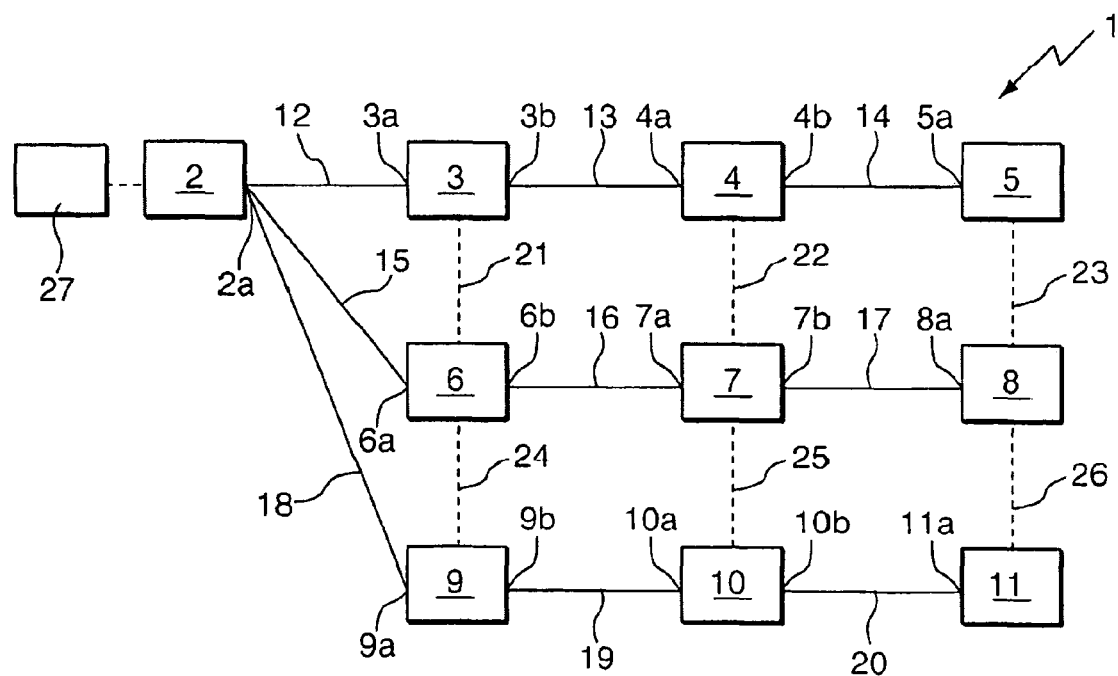
FIG. 2a shows a schematic diagram of a network configuration of the computer network of FIG. 1 set up by a spanning tree protocol.

Each of the bridges 2 to 11 shown in FIGS. 1, 2a comprises a plurality of enabled (forwarding) bridge ports 2a to 11a, 3b, 4b, 6b, 7b, 9b, 10b for connecting the bridges 2 to 11 of the spanning tree to each other via the corresponding links 12 to 20. Those bridge ports 2a to 11a which connect the bridges 2 to 11 with a link leading to the root bridge 2 will be referred to as root ports 2a to 11a in the following. Those bridge ports which may be used for connecting the bridges 3 to 11 via the deactivated links 21 to 26 are not used in the tree-shaped configuration and are therefore not shown in FIG. 2a. It is understood that any of the bridges 2 to 11 of FIG. 2a may be connected via further bridge ports to additional bridges or terminals of the computer network 1.

For the design of STP, it was assumed that all of the bridges 2 to 11 are equal and may attach/detach with equal probability. However, in today's networks, the administrator will choose a bridge located at a central point of the network as the root of the spanning tree by setting the bridge ID accordingly, the root bridge typically being close to a network management unit 27 which may also serve as a STP instance for managing the STP process. Compared to the other bridges, the root bridge has a higher availability as it is a device with higher performance and built using higher quality and/or redundant components. Furthermore, most of the terminals' data flows are directed through the gateway and thus through the root bridge. Especially the authorization of terminals (IEEE 802.1X Port-Based Network Access Control, RFC3588 Diameter) and users (application-specific, e.g., RFC3261 SIP) requires communication with a server that is typically located at a central location. Most if not all of the terminals will reach that location through the root bridge.

Figure 2B:
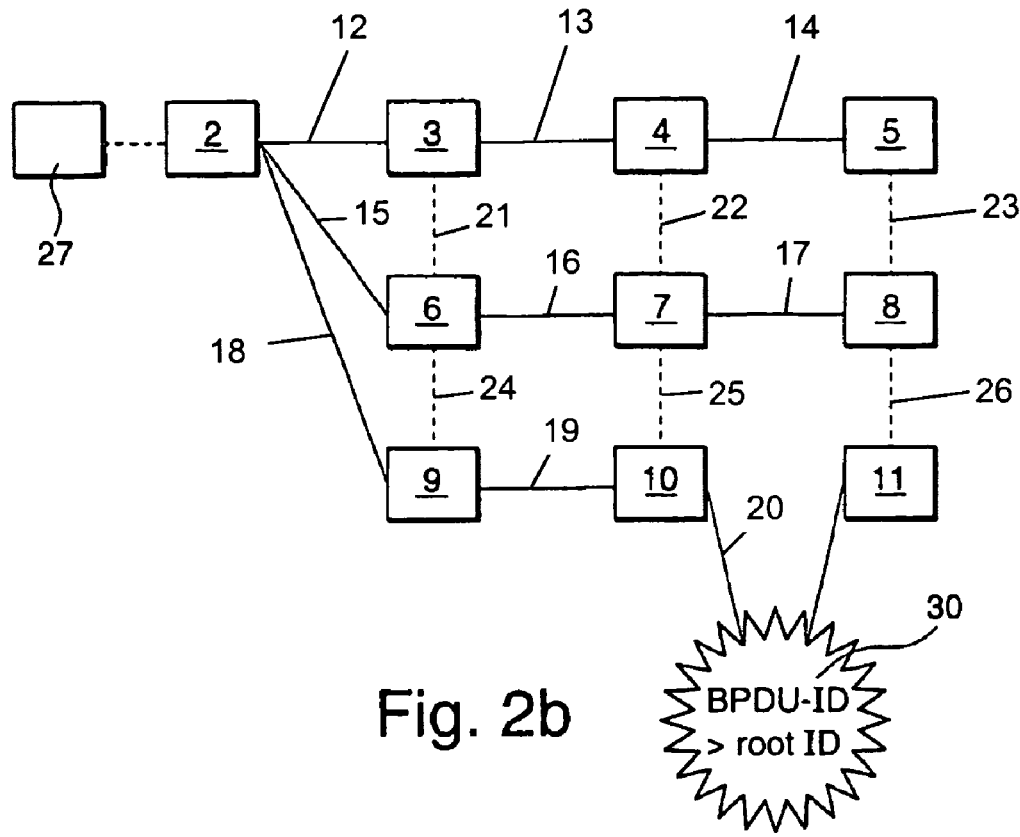
FIGS. 2b-c show how the network configuration of FIG. 2a may be changed by an attacker transmitting a STP message to one of the bridges of the computer network in case of an unprotected network configuration.

FIG. 2b shows such an attacker 30 which is connected to the link 20 between bridges 10 and 11, transmitting a forged BPDU carrying a root bridge ID that is larger than the ID of the current root bridge 2. According to the standard STP protocol procedure, such a BPDU will not cause any changes in the configuration of the network 1, as the root bridge is always chosen as the bridge with the lowest root bridge ID.

Figure 2C:
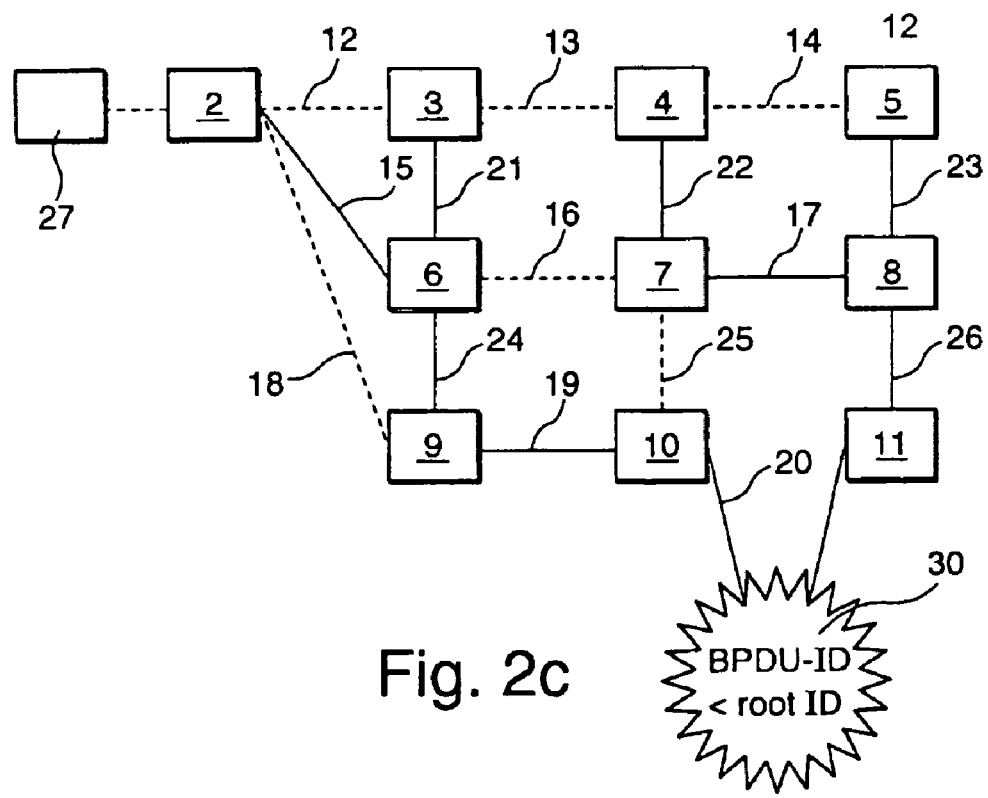

However, when the attacker 30 transmits a BPDU carrying a root ID that is lower than the ID of the current root bridge 2 (this corresponds to a higher priority of the bridge), the bridge election mechanism is restarted and the regular STP will build a new spanning tree, as shown in FIG. 2c. As the new spanning tree is built starting from the attacker's location 30, major links 12 to 13, 16, and 18 in the network 1 may be deactivated, thus negatively impacting the entire network's operation.

Figure 3A:
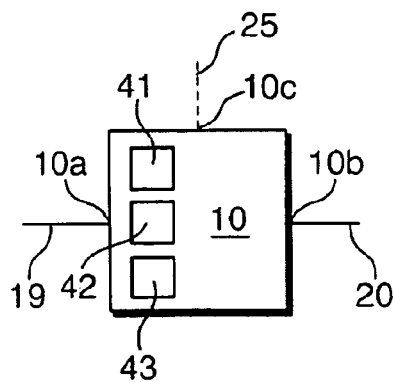

FIG. 3a shows the bridge 10 of the computer network 1 of FIG. 2a in greater detail. The bridge 10 comprises a first forwarding bridge port 10a which is connected to the root bridge 2 via links 18, 19 and which will also be referred to as a root port in the following, a second forwarding bridge port 10b which is connected by a link 20 to a further bridge 11 of FIG. 2a, and a third bridge port 10c which is disabled in the network configuration of FIG. 2a.

The bridge 10 further comprises a sub-state setting unit 41, a receiving unit 42, and a network configuration protection unit 43. The receiving unit 42 is adapted to receive STP messages, in particular BPDUs, in the two forwarding bridge ports 10a, 10b. The sub-state setting unit 41 and the network configuration protection unit 43 are adapted to protect the network configuration of FIG. 2a from attacks in a way which will be described in further detail below. The person skilled in the art will appreciate that although the sub-state setting unit 41, the receiving unit 42, and the network configuration protection unit 43 are shown as separate entities in FIG. 3a, these may be implemented in one physical entity, e.g. a microprocessor, ASIC, . . . in the bridge 10. Also, instead of providing three units 41 to 43 which are used for all of the bridge ports 10a to 10c, separate units may be used for each of the bridge ports 10a to 10c.

Figure 3B:
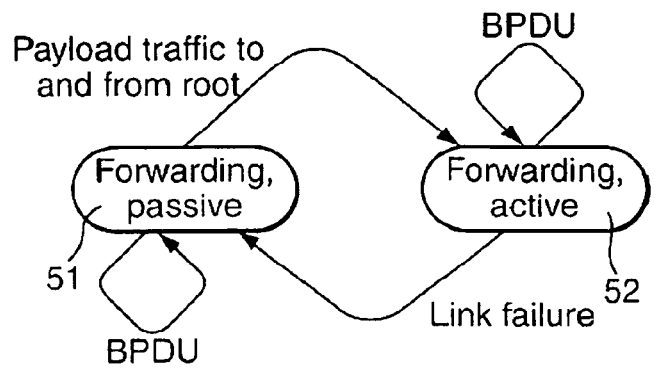

The functionality of the sub-state setting unit 41 may best be explained with reference to FIG. 3b, representing a state diagram of the forwarding bridge ports 10a, 10b of FIG. 3a. In the diagram, the forwarding state is split up in an passive sub-state 51 and an active sub-state 52. As long as bidirectional payload traffic from the terminals is conveyed through the bridge ports 10a, 10b, they are in the active sub-state 52. In case of, e.g., a link failure, the traffic ceases and the bridge ports 10a, 10b change to the passive sub-state 51. As also indicated in FIG. 3b, BPDUs don't cause a transition between the sub-states 51, 52. They may, however, cause a change of the bridge port state according to the STP, i.e. a change of the root port or a change of the bridge ports 10a, 10b, from a forwarding state to a disabled state and vice versa.

Based on the two-state mechanism shown in FIG. 3b, an extended protocol state transition diagram shown in the flow chart of FIG. 4 can be executed, which will be described in the following for the second bridge port 10b. In a first step 100, the sub-state setting device 41 sets the forwarding bridge port 10b to the active sub-state 52 shown in FIG. 3b, as there is no failure in the link 20 to the bridge 11 and consequently, bidirectional traffic passes through the second bridge port 10b. In a second step 101, a BPDU is received by the receiving unit 42 of the second bridge port 10b. In a third step 102, the arriving BPDU is checked by the network configuration protection unit regarding the root bridge ID included therein. If the root bridge ID is lower than the root bridge ID known to the bridge 10, it may be safely assumed that the BPDU is forged. This is due to the fact that in the forwarding/active state, the bidirectional payload traffic indicates a functional path to the root bridge 2 of FIG. 2a, thus there is no need for a re-configuration. Such a forged BPDU may safely be discarded in a step 103 and an alarm signal may inform the network management unit 27 about the incident. However, when the root bridge ID in the BPDU is larger than the known root bridge ID, the BPDU will not cause a re-configuration anyway and may therefore be safely passed to the STP instance, typically the network management unit 27.

In case that the root bridge ID in the received BPDU is equal to the root bridge ID known to the bridge 10, the root path costs included in the BPDU need to be analyzed carefully in steps 104a to 104c. The bridge's root port 10a (and thus the switching table) remains unchanged whenever the root port 10a receives an update with lower root path costs, or a non root port (such as the bridge port 10b) receives a BPDU with increased costs. In this case, it can safely be assumed that the network may continue with its normal operation and the process may continue in a subsequent step 105. Also, in case the root port 10a receives a BPDU with increased root path costs, thus potentially triggering a root port switchover, the BPDU may safely be passed to the STP instance 27 as well (in step 104b), since such a BPDU has an effect which is equal or less as compared to jamming the particular link.

However, when a non root port, such as the bridge port 10b, receives a BPDU with root path costs that are lower so they would change the root port 10a of the bridge 10, it could either indicate that a new link has been added to the network 1, or the network management unit 27 has decided to change the link costs in order to redirect traffic, or an attacker tries to disturb the network's operation. If the latter is the case, such forged BPDU's sent out on one link could reshuffle the traffic throughout the entire network 1 with detrimental effects on the network's operation, as has been described above with reference to FIG. 2c.

Therefore, in order to reduce the likelihood of passing a forged BPDU to the STP instance 27, the root path costs need to be checked for plausibility beforehand (in step 104c) by the network configuration protection unit 43. This may be done by, e.g., analyzing the difference between the previous and the new costs with respect to known properties of the network's topology and rules given to the network management unit 27 with respect to the permitted range of link cost values, thus further reducing the potential impact of an attacker's forged BPDUs. In case that a BPDU with forged root path costs is identified in such a way, the BPDU is discarded and an alarm message is sent to the STP instance 27 in a way analogous to step 103. In case that no forged BPDU is detected, in a subsequent step 106, the sub-state setting unit 41 checks if bidirectional traffic passes through the bridge port 10b and sets the bridge port 10b to an active sub-state, such that the process described in FIG. 4 may start over again. It is understood that the process described above may be applied equally well to the root port 10a of the bridge 10, a check of the root path costs not being required in this case.

Figure 4:
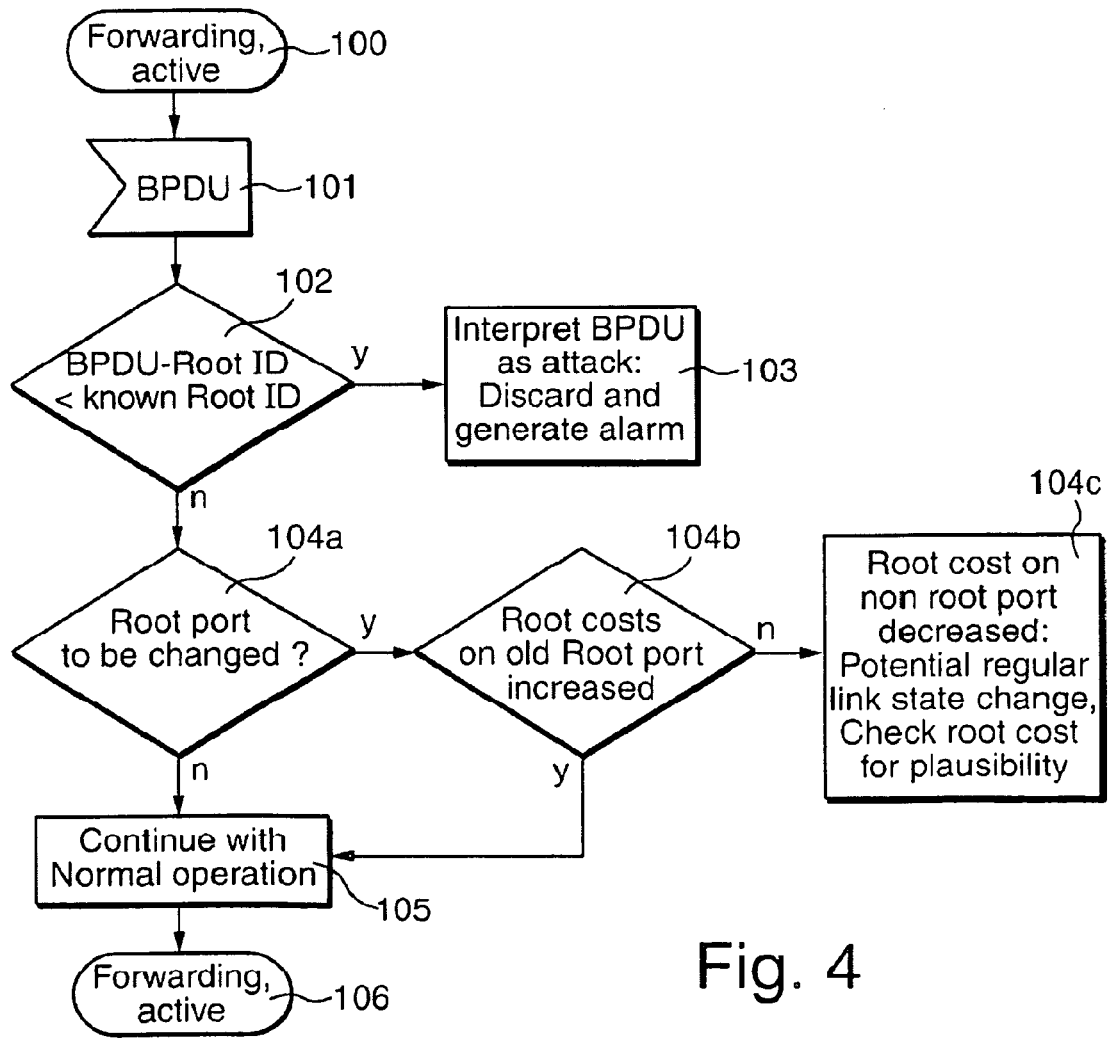

For protecting the entire network 1, the process described with reference to FIG. 4 is preferably applied to the bridge ports 3a to 11a, 3b, 4b, 6b, 7b, 9b, 10b of each of the bridges 3 to 11 of the network shown in FIG. 2a. In such a way, the entire network 1 can be protected from being disturbed by an attacker having access to one or more internal links 12 to 20 without the need for changes to the STP protocol format or additional configuration overhead. Thus, the schema described herein is especially advantageous in typical corporate network settings with most of the traffic going through a distinct pivotal point, but does not jeopardize the protocol's stability in networks with other characteristics.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

The invention claimed is:

1. A method for protecting a network configuration set up by a spanning tree protocol, STP, by selecting one of a plurality of bridges of a computer network as a root bridge and by selecting one of a plurality of forwarding bridge ports of each of the plurality of bridges as a root port, wherein the selected one of the plurality of forwarding bridge ports is in a forwarding state, the method comprising the steps of:

splitting the forwarding state of the bridge port to an active and a passive sub-state through an additional state machine unit added to each of the forwarding bridge ports;

setting a sub-state of at least one forwarding bridge port of at least one of the bridges to an active sub-state as long as bidirectional payload traffic is conveyed through the forwarding bridge port;

receiving an STP message, in particular a Bridge Protocol Data Unit, BPDLT, in one of the forwarding bridge ports being in the active sub-state, and protecting the network configuration by discarding the STP message and by sending an alarm message to a network management unit in case that the STP message indicates a change of the root bridge of the network configuration;

wherein the change of the root bridge is indicated by a bridge port ID of the BPDU which is smaller than the bridge port ID of the root bridge of the network configuration.

2. Method according to claim 1, further comprising the step of checking the root path costs of the STP message for plausibility in case that the STP message indicates a change of the root port and a decrease of the root path costs.

3. Method according to claim 2, wherein checking of the root path costs for plausibility is performed by comparing the root path costs of the STP message with the actual root path costs, taking into account the topology of the network and/or a permitted range of root path costs set by the network management unit.

4. Bridge for operating in a network configuration of a computer network set up by a spanning tree protocol, STP, by selecting one of a plurality of forwarding bridge ports of the bridge as a root port and by selecting one of a plurality of bridges of the computer network as a root bridge, the bridge comprising:

a sub-state setting unit for splitting a forwarding state of the bridge port to an active and a passive sub-state through an additional state machine unit added to each of the forwarding bridge ports and for setting the sub-state of the forwarding state of at least one of the forwarding bridge ports to an active sub-state as long as bidirectional payload traffic passes through the forwarding bridge port, a receiving unit for receiving a STP message, in particular a Bridge Protocol Data Unit, BPDU, in one of the forwarding bridge ports being in the active sub-state, and a network configuration protection unit for protecting the network configuration by discarding the STP message and by sending an alarm message to a network management unit in case that the STP message indicates a change of the root bridge of the network configuration;

wherein a change of the root bridge is indicated in the network configuration protection unit by a bridge port ID of the BPDU which is smaller than the bridge port ID of the root bridge.

5. Bridge according to claim 4, wherein the network configuration protection unit is adapted to check the root path costs of the STP message for plausibility in case that the STP message indicates a change of the root port and a decrease of the root path costs.

6. Bridge according to claim 5, wherein the network configuration protection unit is adapted to check the root path costs for plausibility by comparing the root path costs of the STP message with the actual root path costs, taking into account the topology of the network and/or a permitted range of root path costs set by the network management unit.

7. Computer network comprising a plurality of bridges according to claim 4, the computer network operating in a network configuration set up by a spanning tree protocol, STP, by selecting one of the plurality of bridges as a root bridge and by selecting one of a plurality of forwarding bridge ports of each of the plurality of bridges as a root port.

8. Computer network according to claim 7, further comprising a network management unit.

* * * * *